(12) United States Patent
Neumann

(10) Patent No.: US 7,131,770 B2
(45) Date of Patent: Nov. 7, 2006

(54) HYDRO FILL CONTROLLING SHIELD AND SLEEVE FOR A HYDRODYNAMIC BEARING

(75) Inventor: Rudolf Neumann, Spaichingen (DE)

(73) Assignee: Minebea Co., Ltd., Nagano (JP)

( * ) Notice: Subject to any disclaimer, the term of this patent is extended or adjusted under 35 U.S.C. 154(b) by 358 days.

(21) Appl. No.: 10/623,201

(22) Filed: Jul. 18, 2003

(65) Prior Publication Data

US 2005/0013517 A1    Jan. 20, 2005

(51) Int. Cl.
*F16C 32/06* (2006.01)
*F16C 33/74* (2006.01)

(52) U.S. Cl. .................... 384/119; 384/132
(58) Field of Classification Search .......... 384/100, 384/114, 118, 119, 120, 130, 132; 277/400; 310/90; 360/99.08, 98.07
See application file for complete search history.

(56) References Cited

U.S. PATENT DOCUMENTS

| | | | |
|---|---|---|---|
| 5,524,986 A | 6/1996 | Leuthold et al. | |
| 5,876,124 A | 3/1999 | Zang et al. | |
| 5,957,589 A | 9/1999 | Lee et al. | |
| 5,993,066 A * | 11/1999 | Leuthold et al. | 384/113 |
| 6,066,903 A * | 5/2000 | Ichiyama | 310/90 |
| 6,322,252 B1 | 11/2001 | Grantz et al. | |
| 6,375,357 B1 * | 4/2002 | Miura et al. | 384/100 |
| 6,583,952 B1 * | 6/2003 | Grantz et al. | 360/99.08 |
| 6,672,766 B1 * | 1/2004 | Nottingham et al. | 384/110 |
| 6,900,568 B1 * | 5/2005 | LeBlanc et al. | 310/90 |
| 2002/0053138 A1 | 5/2002 | Kloeppel et al. | |

* cited by examiner

*Primary Examiner*—Richard Ridley
*Assistant Examiner*—Justin Krause
(74) *Attorney, Agent, or Firm*—Joel E. Lutzker, Esq.; John C. Garces, Esq.; Schulte Roth & Zabel LLP

(57) ABSTRACT

A hydrodynamic bearing system, having a bearing sleeve and a shaft inserted into an inner cylindrical bore of the bearing sleeve. A bearing gap is formed between the shaft and the bearing sleeve, the bearing gap being filled with a lubricating oil. A shield encloses the bearing sleeve. The shield is secured at to an end surface of the bearing sleeve at a position on the end surface that is distanced from the bearing gap. The shield does not contact the lubricating oil.

10 Claims, 2 Drawing Sheets

HYDRO FILL CONTROLLING SHIELD AND SLEEVE FOR A HYDRODYNAMIC BEARING

FIELD OF THE INVENTION

The present invention generally relates to a spindle motor. More specifically, the invention relates to a spindle motor utilizing a fluid dynamic pressure bearing to support a shaft within a bearing portion, the shaft being surrounded by lubricating oil enclosed in the bearing portion.

BACKGROUND OF THE INVENTION

Disk drive memory systems have been used in computers for many years for storage of digital information. Information is recorded on concentric memory tracks of a magnetic disk medium, the actual information being stored in the form of magnetic transitions within the medium. The disks themselves are rotatably mounted on a spindle the information being accessed by means of read/write heads generally located on a pivoting arm which moves radially over the surface of the disk. The read/write heads or transducers must be accurately aligned with the storage tracks on the disk to ensure proper reading and writing of information.

During operation, the disks are rotated at very high speeds within an enclosed housing by means of an electric motor generally located inside the hub or below the disks. One type of motor in common use is known as an in-hub or in-spindle motor. Such in-spindle motors typically have a spindle mounted by means of two ball bearing systems to a motor shaft disposed in the center of the hub. However, with the decreasing size of information storage systems, other types of bearings including hydrodynamic bearings are being developed.

In these types of systems, lubricating fluid—either gas or liquid—functions as the actual bearing surface between a stationary base or housing and the rotating spindle or rotating hub and the stationary surrounding portion of the motor. For example, liquid lubricants comprising oil, more complex ferro-magnetic fluids, or even air have been utilized for use in hydrodynamic bearing systems. The reason for the popularity of the use of air, is the importance of avoiding the outgassing of contaminants into the sealed area of the head disk housing. However, air does not provide the lubricating qualities of oil. Its low viscosity requires smaller bearing gaps and therefore higher tolerance standards to achieve similar dynamic performance.

In the case of a hydrodynamic bearing employing a liquid lubricant, the lubricating fluid and its components must be sealed within the bearing to avoid loss of lubricant which results in reduced beating load capacity. If too much lubricant evaporates from the bearing, physical surfaces of the spindle and housing can contact one another, leading to increased wear and eventual failure of the bearing system. Equally seriously, loss of a seal or failure to control the fluid level within the bearing, system could cause contamination of the hard disk drive with lubricant particles and droplets as well as outgassing-related condensation.

A further difficulty with prior art designs of liquid lubrication hydrodynamic bearings is that, during operation of the spindle motor, lubricating fluid can splash onto the shaft and migrate along the shaft into the environment. To prevent this oil migration and/or splashing, a sealing shield may be provided at one end of the shaft enclosing the bearing system.

An example of a conventional hydrodynamic bearing system 100 incorporating a shield is shown in FIG. 2(b).

Hydrodynamic bearing system 100 includes a shaft 112 with a bearing element 114 secured thereto. Shaft 112 is inserted into an inner cylindrical bore of bearing sleeve 116 such that a bearing gap is formed between an outer surface of the shaft with the bearing element and an inner surface of the sleeve. The bearing gap is filled with lubricating oil 118. Oil reservoir 122 is provided at the top portion of the bearing gap to accommodate excess oil. Shield 120 having cylindrical opening 132 is placed over shaft 112 and secured to step 126 of bearing sleeve 116 such that its inner surface partially contacts lubricating oil 118. Oil fill hole 128 is provided in the shield to enable injection of lubricating oil 118 into the bearing gap.

During assembly of conventional hydrodynamic bearing system 100, bearing element 114 is press-fit onto shaft 112 which is then inserted into the inner cylindrical bore of bearing sleeve 116. Shield 120 is then placed onto step 126 of the bearing sleeve such that shaft 112 protrudes through cylindrical opening 132. Shield 120 is laser welded to the bearing sleeve. Laser welding is identified by reference numeral 124. Lubricating oil 118 is next injected into the bearing gap through oil fill hole 128.

For proper functioning of the spindle motor, it is very important to inject an adequate but not excessive amount of lubricating oil through the oil fill hole. However, the above method of assembly does not allow a manufacturer to observe the level of lubricating oil inside the system and therefore to prevent an insufficiency or overflow of lubricating oil. Manufacturer's view is obstructed by the shield. If, however, the shield is secured to the bearing sleeve after the oil is filled, laser welding of the shield causes lubricating oil to overheat because of its close proximity to the shield.

Thus, there is a need in the art for a hydrodynamic bearing system design allowing a manufacturer to observe the level of lubricating oil inside the system in order to prevent an insufficiency or overflow of lubricating oil.

SUMMARY OF THE INVENTION

In one aspect of the present invention, a hydrodynamic bearing system is provided having a bearing sleeve and a shaft inserted into an inner cylindrical bore of the bearing sleeve. A bearing gap is formed between the shaft and the bearing sleeve, the bearing gap being filled with a lubricating oil. A shield encloses the bearing sleeve. The shield is secured an end surface of the bearing sleeve at a position on the end surface that is distanced from the bearing gap. The shield does not contact the lubricating oil.

In another aspect of the present invention, a method of manufacturing a hydrodynamic bearing system is provided. In accordance with the provided method, a bearing element is first mounted onto a shaft, the shaft is then inserted into a bearing sleeve and a bearing gap formed between the shaft and the bearing sleeve is filled with lubricating oil while observing the fill level of said lubricating oil. The shield is then placed onto the bearing sleeve such that the shield does not contact the lubricating oil and is welded to the sleeve.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figure 1:
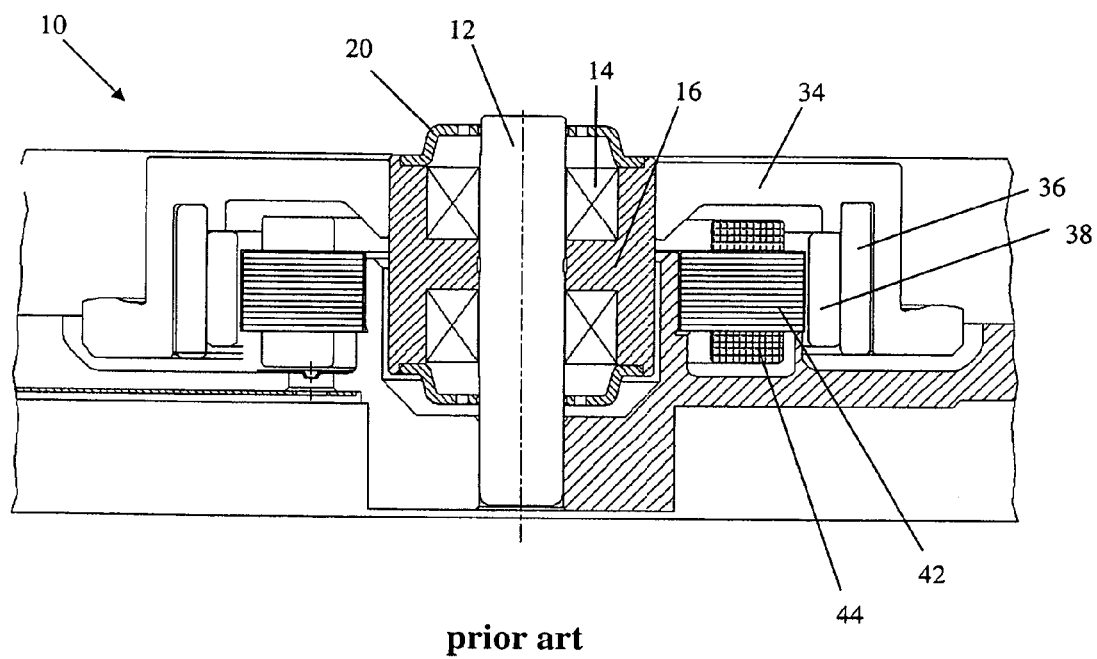
FIG. 1 is a cross-sectional view of a spindle motor having a hydrodynamic bearing system.

As shown in FIG. 1, spindle motor 10 comprises a rotor portion and a stator portion. The rotor portion includes hub 34 having bearing sleeve 16 secured within an inner cavity of hub 34. A magnetic disk (not shown) may be secured to the top of hub 34 for rotation with the hub. Yoke portion 36 is mounted to the lower end of hub 34. Permanent magnet 38 is secured to the yoke portion of hub 34. The stator portion comprises fixed shaft 12 inserted into a cylindrical bore of bearing sleeve 16. Bearing elements 14 are mounted on fixed shaft 12 such that a bearing gap is formed between outer surfaces of the fixed shaft with the bearing elements and an inner surface of the bearing sleeve. Although, bearing elements shown in FIG. 2a form a spool bearing, any other type of fluid dynamic bearing can be used with the present invention. For example, conical bearing elements can be used as bearing elements 14.

The bearing gap is filled with lubricating oil 18. Fixed shaft 12 is secured at its bottom end to a frame. (not shown) and at its top end to a top cover (not shown). Stator core 42 with winding 44 is secured to the frame such that the stator core is placed in an opposing relationship with permanent magnet 38 of the rotor portion. Under the influence of the magnetic field generated by permanent magnet 38 and stator core 42 with its winding sleeve 16 with hub 34 rotates around fixed shaft 12 mediated by a film of lubricating oil.

Figure 2B:
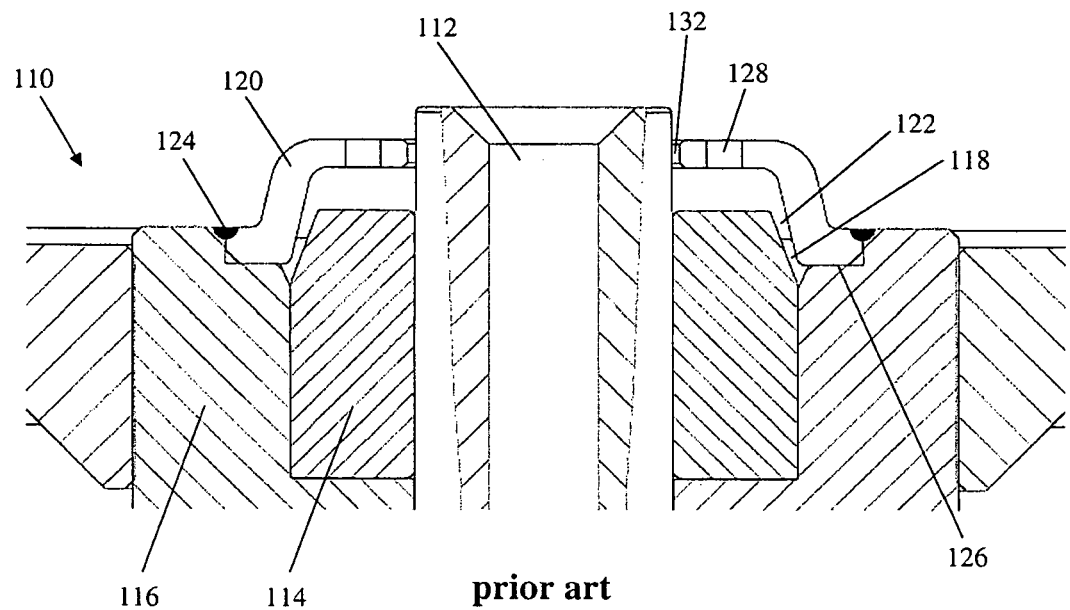
FIG. 2b is a partial cross-sectional view of a hydrodynamic bearing system having a conventional design of the shield and the bearing sleeve.
Figure 2A:
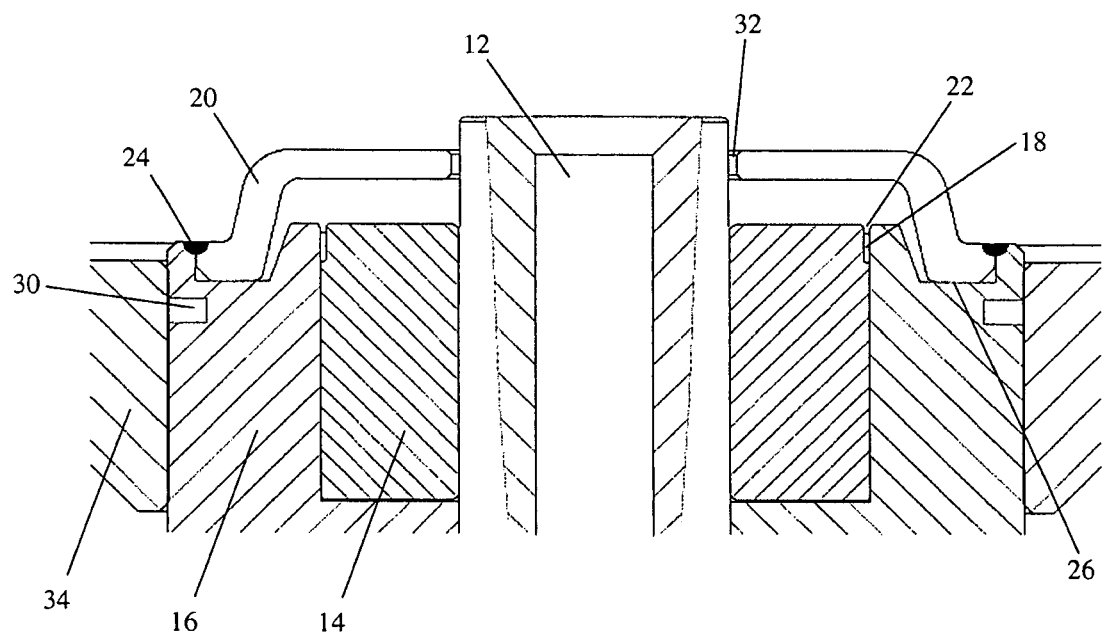
FIG. 2a is a partial cross-sectional view of a hydrodynamic bearing system having a new shield and sleeve design in accordance with the present invention.

As more particularly shown in FIG. 2a, reservoir 220 is formed between bearing sleeve 16 and bearing element 14 at their upper ends to accommodate excess of lubricating oil. Shield 20 is placed on the top surface of bearing sleeve 16 and laser welded to it. Laser welding is indicated with a reference numeral 24. Fixed shaft 12 protrudes through cylindrical opening 32 of shield 20. In the preferred embodiment, the place of attachment between shield 20 and bearing sleeve 16 is distanced from reservoir 22 and the bearing gap such that shield 20 does riot contact lubricating oil 18. Further, temperature barrier groove 30 is provided in bearing sleeve 16, which prevents bearing sleeve 16 from overheating during the welding process.

As shown in FIG. 2a, the lower end of shield 20 may be secured within a recess 26 formed on the top surface of bearing sleeve 16. Recess 26 is formed in such a way as to leave a wall between the recess and reservoir 22. The wall prevents the lubricating oil in the reservoir and the bearing gap from overheating during the welding process.

In order to assemble the hydrodynamic bearing system in accordance with the present invention, bearing element 14 is press-fit onto shaft 12 which is then inserted into the inner cylindrical bore of bearing sleeve 16. Lubricating oil 18 is next filled into the bearing gap. The oil filling process is preferably accomplished using a microdrop method under control of a microscope. Because the shield is not placed over the opening of the bearing sleeve, a manufacturer can easily observe the level of lubricating oil in the bearing gap and reservoir. Thus, insufficiency or overflow of lubricating oil may be prevented. Shield 20 is then placed into recess 26 or on top of the bearing sleeve such that shaft 12 protrudes through cylindrical opening 32. Shield 20 is laser welded to the bearing sleeve.

The shield and bearing sleeve design provided by the present invention allows the manufacturer to fill an adequate but not excessive amount of lubricating oil because a manufacturer is able to observe the level of lubricating oil inside the system and therefore to prevent an insufficiency or overflow of lubricating oil. Manufacturer's view is no longer obstructed by the shield. Because the shield is separated from the reservoir and the bearing gap, lubricating oil does not overheat during the laser welding process. Thus, shield can be secured to the bearing sleeve after the oil is filled.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A hydrodynamic bearing system comprising:
    a shaft having an outer surface;
    a bearing sleeve, said bearing sleeve having an inner cylindrical bore, said shaft being inserted into said inner cylindrical bore;
    a bearing gap formed between said outer surface of said shaft and said bearing sleeve, said bearing gap being filled with a lubricating oil;
    said bearing sleeve further comprising:
        an outer cylindrical surface;
        an inner cylindrical surface; and
        an end surface, said end surface having a recessed portion
    said recessed portion being defined by a radially outward facing axial surface and a radially inward facing axial surface; and
    said recessed portion is positioned between said inner cylindrical surface and said outer cylindrical surface and distanced from said bearing gap,
        wherein an area of said end surface between said radially outward facing surface of said recessed portion and said inner cylindrical surface of said bearing sleeve defines a wall between said recessed portion and said bearing gap;
    a shield enclosing said bearing sleeve, wherein said shield is mounted in said recessed portion; and
    wherein, said shield, an outer surface of said shaft and said end surface define an inner shielded space, said recessed portion is located within said inner shielded space.

2. The hydrodynamic bearing system according to claim 1 further comprising at least one bearing element mounted on said shaft, wherein said bearing gap is formed between said bearing sleeve and said bearing element.

3. The hydrodynamic bearing system according to claim 1 further comprising a lubricating oil reservoir, wherein said shield is secured to said end surface of said bearing sleeve at a position that is distanced from said lubricating oil reservoir.

4. The hydrodynamic bearing system according to claim 1, further comprising a temperature barrier groove located on said outer cylindrical surface of said bearing sleeve.

5. The hydrodynamic bearing system according to claim 1, wherein said shield is secured to said bearing sleeve by laser welding.

6. A spindle motor having a hydrodynamic bearing system, said hydrodynamic bearing system comprising:
   a shaft having an outer surface;
   a bearing sleeve, said bearing sleeve having an inner cylindrical bore, said shaft being inserted into said inner cylindrical bore;
   a bearing gap formed between said outer surface of said shaft and said bearing sleeve, said bearing gap being filled with a lubricating oil;
   said bearing sleeve further comprising:
      an outer cylindrical surface;
      an inner cylindrical surface; and
      an end surface, said end surface having a recessed portion
   said recessed portion being defined by a radially outward facing axial surface and a radially inward facing axial surface; and
   said recessed portion is positioned between said inner cylindrical surface and said outer cylindrical surface and distanced from said bearing gap,
      wherein an area of said end surface between said radially outward facing surface of said recessed portion and said inner cylindrical surface of said bearing sleeve defines a wall between said recessed portion and said bearing gap;
   a shield enclosing said bearing sleeve, wherein said shield is mounted in said recessed portion; and
wherein, said shield, an outer surface of said shaft and said end surface.

7. The spindle motor according to claim 6 further comprising at least one bearing element mounted on said shaft, wherein said bearing gap is formed between said bearing sleeve and said bearing element.

8. The spindle motor according to claim 6 further comprising a lubricating oil reservoir, wherein said shield is secured to said end surface of said bearing sleeve at a position that is distanced from said lubricating oil reservoir.

9. The spindle motor according to claim 6, further comprising a temperature barrier groove located on said outer cylindrical surface of said bearing sleeve.

10. The spindle motor according to claim 6, wherein said shield is secured to said bearing sleeve by laser welding.

* * * * *